UNITED STATES PATENT OFFICE.

EBERHARD F. MEES, OF MILWAUKEE, WISCONSIN, ASSIGNOR OF ONE-HALF TO EMIL C. SCHOENE, OF MILWAUKEE, WISCONSIN.

PAINT.

1,396,970.  Specification of Letters Patent.  Patented Nov. 15, 1921.

No Drawing.   Application filed June 24, 1921.   Serial No. 480,199.

*To all whom it may concern:*

Be it known that I, EBERHARD F. MEES, a citizen of the United States, and resident of Milwaukee, in the county of Milwaukee and State of Wisconsin, have invented new and useful Improvements in Paint, of which the following is a description, reference being had to the accompanying drawings, which are a part of this specification.

The invention relates to paints for coating metal.

The object of the invention is to provide a fireproof and rustproof paint for coating metal, more particularly iron, to prevent its deterioration.

The invention further consists in the several features hereinafter set forth and more particularly defined by claims at the conclusion hereof.

The paint consists of a binder, such as glucose, sodium silicate or other alkaline silicate, oxid of manganese, and any suitable coloring ingredient. To this graphite may be added to give a smooth finish to the surface.

To make the paint I dissolve one pound of glucose in two gallons of boiling water and allow it to cool. To this solution I add five gallons of sodium silicate and then add, while stirring constantly, the coloring matter, such as one-half pound of carbon black, and one-half pound of graphite when it is desired, and I then add to this solution twelve pounds of oxid of manganese. Then the whole mixture is thoroughly stirred and put in cans. The paint after being thoroughly mixed is applied to the metal in the usual manner and allowed to dry and is then either baked on, by placing the coated metal in an oven or furnace, or is fired on by means of a blow torch. Metal, such as cast iron or steel, coated with this paint will resist rust and the paint cannot be burned off and does not bubble or blister. Ordinary paint may be applied over the paint above described.

What I claim as my invention is:

1. A metal paint comprising a binder, an alkaline silicate and oxid of manganese.

2. A metal paint comprising a binder, an alkaline silicate, oxid of manganese and graphite.

3. A metal paint comprising glucose, sodium silicate and oxid of manganese.

4. A metal paint consisting of glucose, sodium silicate, oxid of manganese and graphite.

In testimony whereof I affix my signature.

EBERHARD F. MEES.